(12) United States Patent
Campanella et al.

(10) Patent No.: US 11,097,643 B1
(45) Date of Patent: Aug. 24, 2021

(54) L-ARM PROTECTION SYSTEM AND METHOD OF USE

(71) Applicants: Joseph Campanella, Richland Hills, TX (US); Raj Mane, Fort Worth, TX (US)

(72) Inventors: Joseph Campanella, Richland Hills, TX (US); Raj Mane, Fort Worth, TX (US)

( * ) Notice: Subject to any disclaimer, the term of this patent is extended or adjusted under 35 U.S.C. 154(b) by 111 days.

(21) Appl. No.: 16/557,479

(22) Filed: Aug. 30, 2019

(51) Int. Cl.
*B60P 3/12* (2006.01)
*B62D 53/04* (2006.01)
*B60P 3/07* (2006.01)

(52) U.S. Cl.
CPC ............... *B60P 3/125* (2013.01); *B60P 3/07* (2013.01); *B62D 53/04* (2013.01)

(58) Field of Classification Search
CPC ............................... B60P 3/125; B60D 1/1675
USPC .......................................................... 414/607
See application file for complete search history.

(56) References Cited

U.S. PATENT DOCUMENTS

| | | | | |
|---|---|---|---|---|
| 3,930,585 A * | 1/1976 | Lynch | ..................... | B65G 59/02 414/607 |
| 4,049,146 A * | 9/1977 | Decker | .............. | B62D 53/0828 414/607 |
| 4,737,066 A * | 4/1988 | Allison, Jr. | ............. | B60P 3/125 280/402 |
| 5,762,465 A * | 6/1998 | Zackovich | .............. | B60P 3/125 280/402 |
| 7,556,468 B2 * | 7/2009 | Grata | ....................... | B60P 3/125 414/563 |
| 2003/0231944 A1 * | 12/2003 | Weller | .................... | B60P 3/125 414/463 |
| 2008/0310946 A1 * | 12/2008 | Allen | ........................ | B66F 9/12 414/785 |

* cited by examiner

*Primary Examiner* — Mark C Hageman
(74) *Attorney, Agent, or Firm* — Leavitt Eldredge Law Firm

(57) ABSTRACT

An L-arm protection system includes an L-arm assembly to engage with wheels of a vehicle for towing the vehicle, the L-arm assembly having a first side and a second side; a sleeve to secure over the first side of the L-arm assembly, the sleeve having a body extending from a first side to a second side and having a channel, the first side being open and the second side being closed; a set screw extending through the body and to tighten the body to the first side of the L-arm assembly; and a chain link secured to the second side of the body and to provide a securing point; the body of the sleeve is to secure around the first side of the L-arm assembly via the set screw.

1 Claim, 4 Drawing Sheets

L-ARM PROTECTION SYSTEM AND METHOD OF USE

BACKGROUND

1. Field of the Invention

The present invention relates generally to vehicle towing systems, and more specifically, to an L-arm protection system that utilizes one or more sleeves to protect the L-arms of the two system, thereby prolonging the use of the L-arms.

2. Description of Related Art

Towing systems are well known in the art and are effective means to tow damaged vehicles from one location to another. For example, FIG. 1 depicts a top simplified view of an L-arm assembly system 101 having a connection 103 and a first side 105 and a second side 107 extending therefrom. During use, the connection 103 is secured to a towing vehicle and the first side and second side are used to engage with the wheels of a vehicle to lift and raise the vehicle for transport.

One of the problems commonly associated with system 101 is damage to the L-arm assembly. For example, it is common for a user to have to replace the L-arm assembly on a regular basis due to the assembly wearing down from time to time. This process is expensive and therefore, it would be desirable to provide for a protection system that could prolong the use of the L-arm assembly.

Accordingly, although great strides have been made in the area of vehicle towing systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
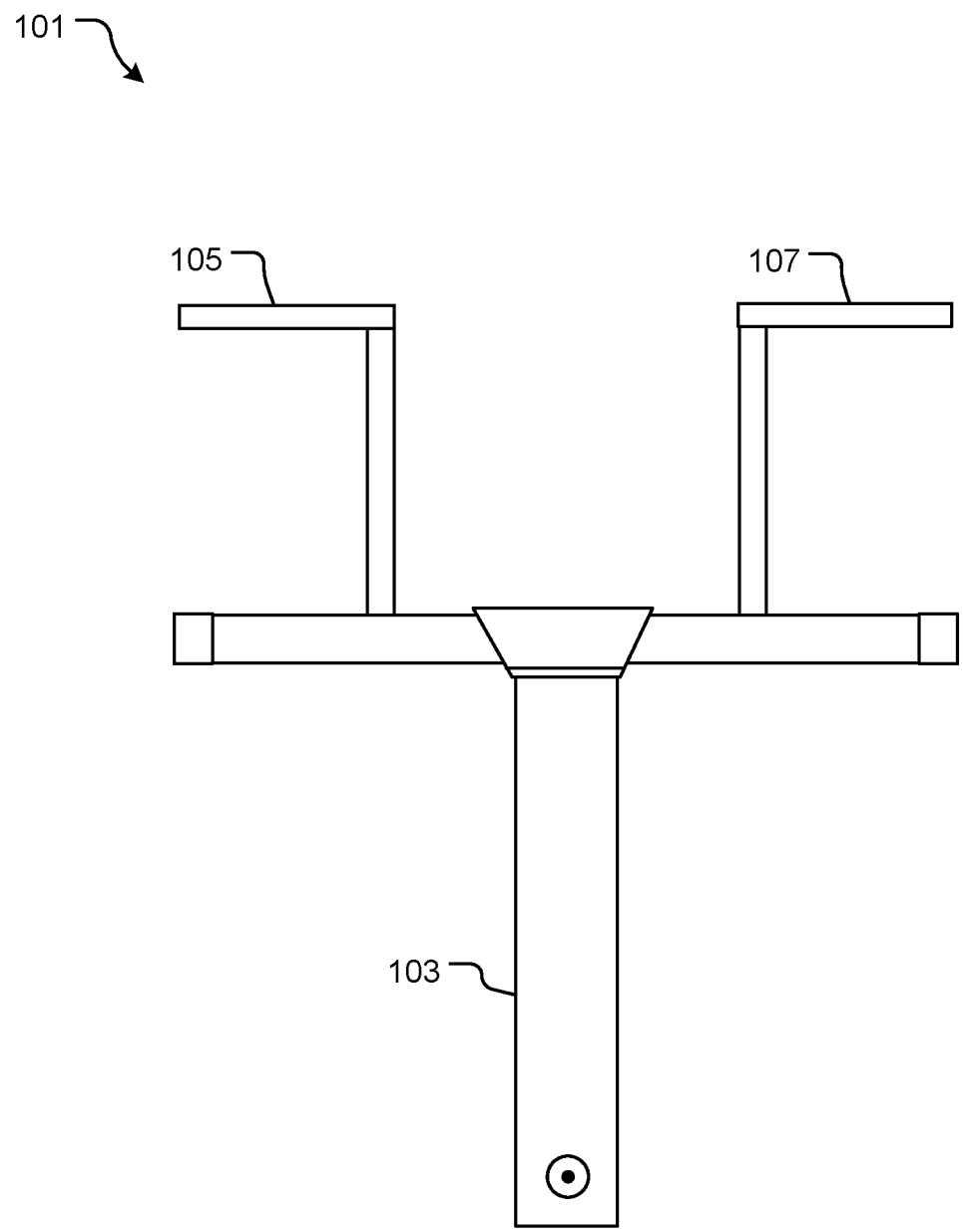
FIG. 1 is a top simplified view of a common L-arm assembly system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional towing systems. Specifically, the present invention provides for one or more protection sleeves to secure to the L-frame assembly to prolong the life of the L-frame. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
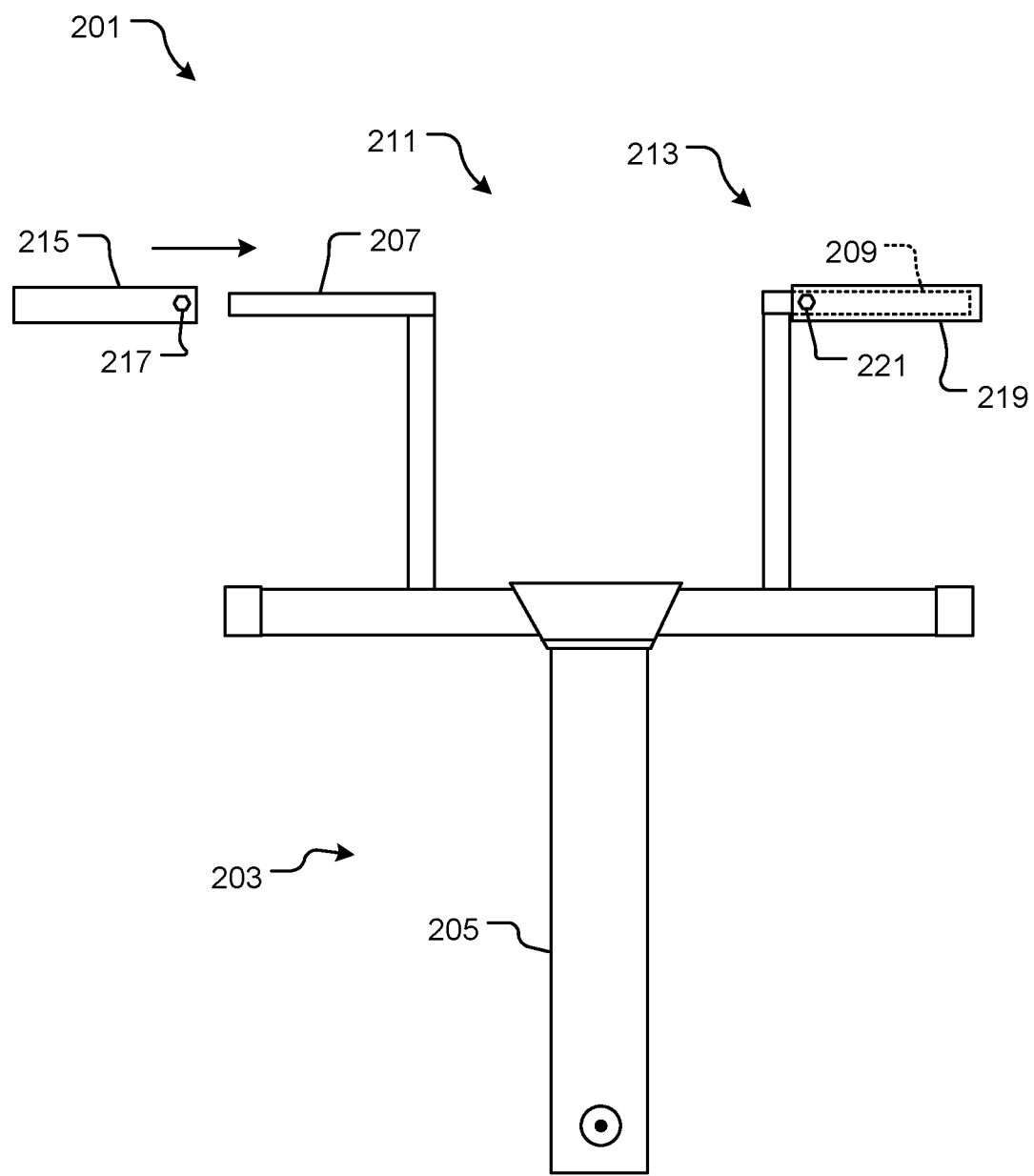
FIG. 2 is a top simplified view of an L-arm protection system in accordance with a preferred embodiment of the present application.
Figure 3:
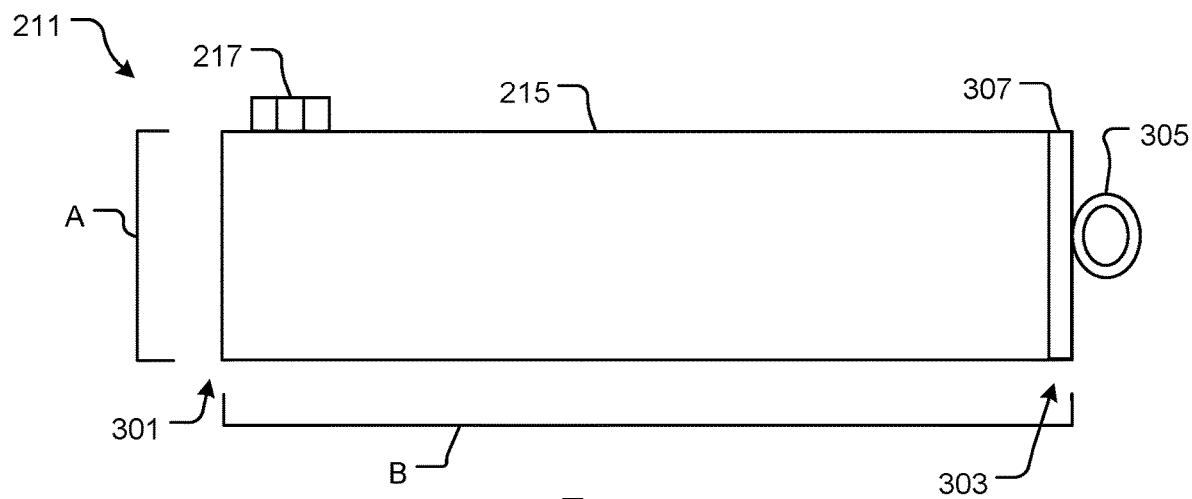
FIG. 3 is a side view of a sleeve in accordance with the present invention.
Figure 4:
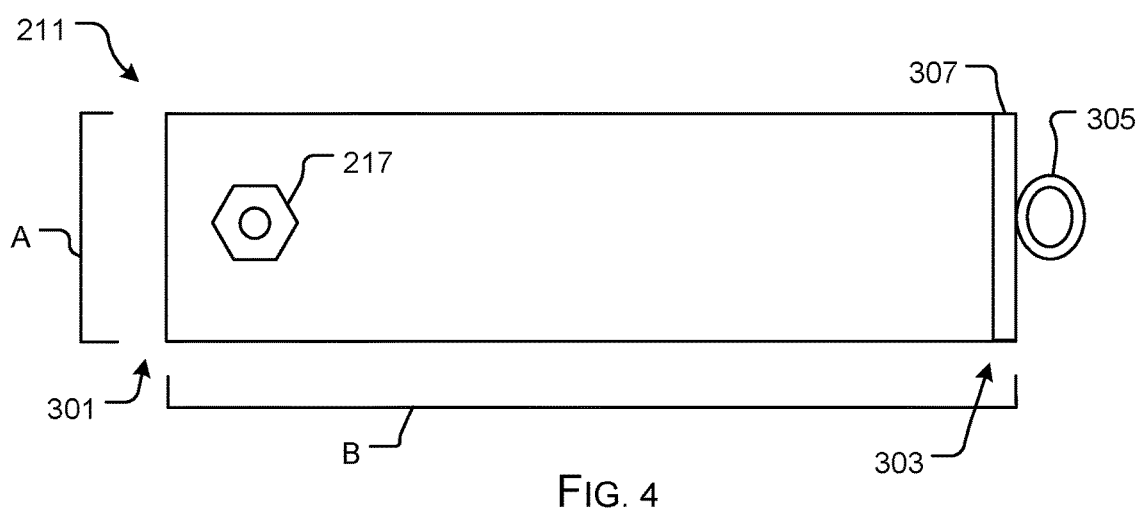
FIG. 4 is a top view of the sleeve.
Figure 5:
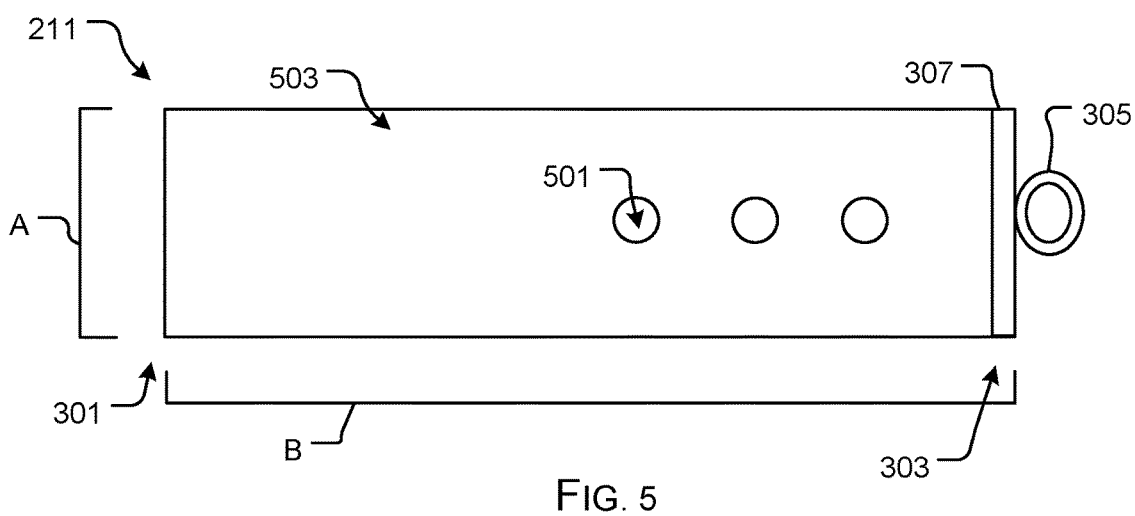
FIG. 5 is a bottom view of the sleeve.

Referring now to the drawings wherein like reference characters identify corresponding or similar elements throughout the several views, FIG. 2 depicts a top view of an L-arm protection system 201 in accordance with a preferred embodiment of the present application. It will be appreciated that system 201 overcomes one or more of the above-listed problems commonly associated with conventional towing systems.

In the contemplated embodiment, system 201 includes an L-arm assembly 203 with a connection 205 and first side 207 and a second side 209 extending therefrom. System 201 further including one or more sleeves 211, 213 configured to secure over the first side and second side of the L-arm assembly, wherein the sleeves 211, 213 provide protection for the sides. The sleeves 211, 213 each including a body 215, 219 with a set screw 217, 221 configured to secure the sleeves in place over the sides, thereby providing protection.

It should be appreciated that one of the unique features believed characteristic of the present application is the use of the sleeves being configured to secure over the sides to protect the L-arm assembly during use. The sleeves will protect the sides during use with vehicle wheels, while preventing the sides from coming into contact with the wheels. The sleeves will be able to be removed, replaced, rotated, and the like. It should be appreciated that the sleeve can vary and be made to fit various sized L-arms. It should be appreciated that the sleeve is much more economical to acquire over the cost of replacing an L-arm and requires no professional licensing, training, or tools to install. Further, it should be appreciated that should one side of the sleeve become excessively worn, the user can remove the sleeve, turn it 180 degrees, and reattach the sleeve to utilize a fresh side of the sleeve.

In FIGS. 3-6, side, top, bottom, and end views of a sleeve 211 in accordance with the present invention are shown. Sleeve 211 including body 215 extending from a first end 301 to a second end 303, wherein the first end 301 is open, thereby forming a channel 601, and the second end 303 includes a closure 307 blocking off the second end. The sleeve 211 further including the set screw 217 which can vary and is configured to tighten into the channel to secure the sleeve to the L-arm. In some embodiments, sleeve 211 further includes a chain link 305 which can be used for tethering and the like.

Figure 6:
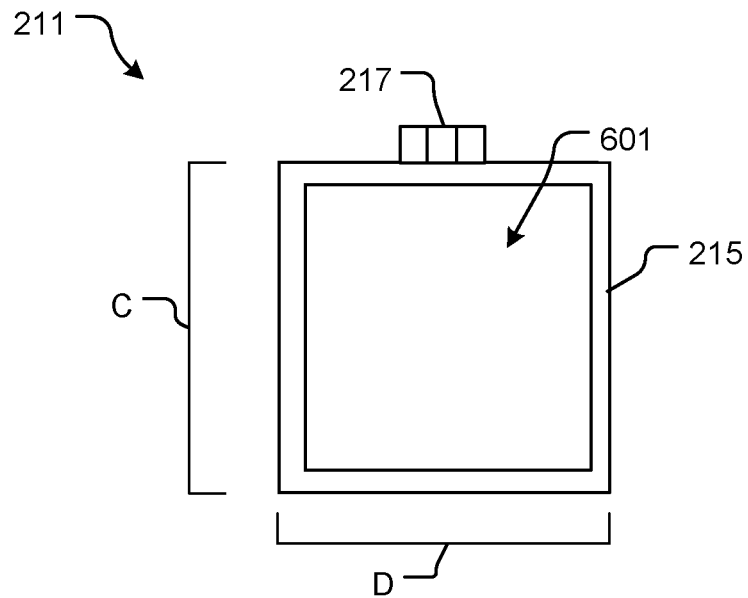
FIG. 6 is an end view of the sleeve.

As shown, the body 215 can vary in dimensions, however, in the preferred embodiment, the body 215 has a width (A) of approximately 2.5 inches and a length (B) between eight and twenty-two inches. As shown in FIG. 6, from an end view, the body 215 is a square with width (C) and (D) being equal and preferably approximately 2.5 inches.

Sleeve 211 further including one or more holes 501 extending into the body from the bottom surface 503 of the body.

Figure 7:
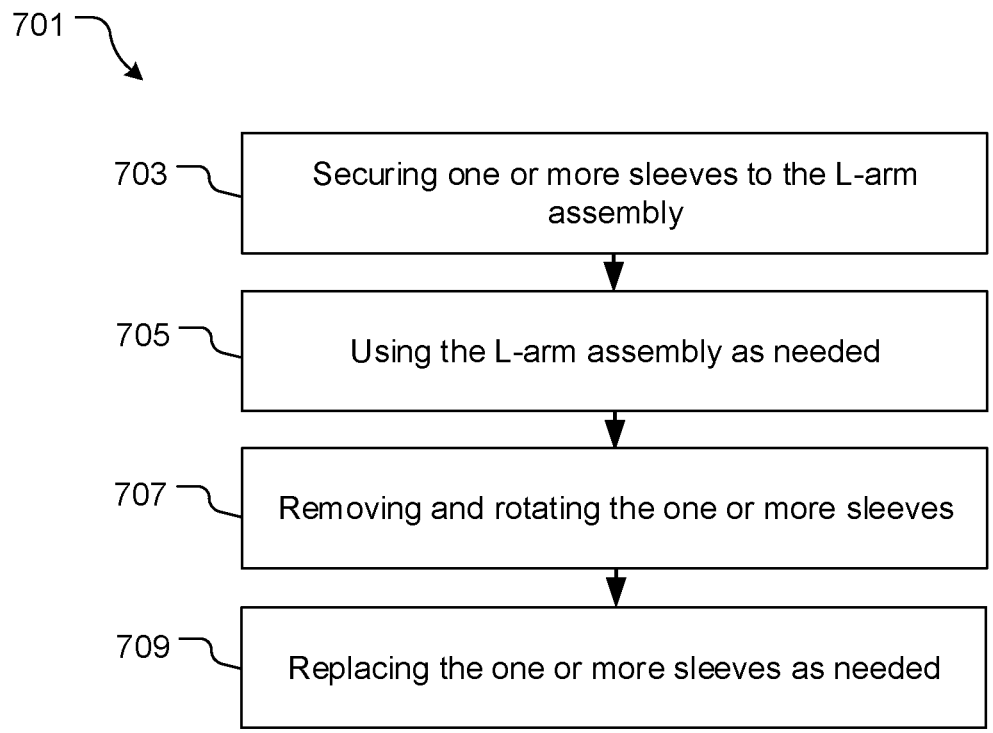
FIG. 7 is a flowchart of the method of use of the system of FIG. 2.

In FIG. 7, a flowchart 701 depicts the method of use of system 201. During use, one or more sleeves are secured to the L-arm assembly thereby providing protection, as shown with box 703. The L-arm assembly is used as normal to engage with and tow a vehicle, as shown with box 705. As needed, the user can remove the sleeves and rotate to engage a new surface with the wheels of the vehicle, as shown with box 707. If needed, the user can further remove and replace the sleeves, as shown with box 709.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method of protecting a first side of an L-arm assembly, the method comprising:
   providing an L-arm protection assembly including a sleeve configured to secure over the first side of the L-arm assembly, the sleeve having:
      a body extending from a first end to a second end, the body forming a channel, wherein the channel extends a length of the body from the first end to the second end, the channel being open at the first end, and the channel being closed at the second end, the body includes a uniform cross sectional shape between the first end and the second end, the cross sectional shape is rectangular;
      a set screw extending through the body near the first end and configured to tighten the body to the first side of the L-arm assembly; and
      a chain link secured to a face on the second end of the body and configured to provide a securing point;
   placing the sleeve over the first side such that the first side is inserted through the first end and extends to the second end;
   securing the sleeve to the first side in a first rotational orientation via tightening of the set screw;
   removing the sleeve by untightening the set screw and sliding the sleeve off of the first side;
   rotating the sleeve at least 90 degrees; and
   securing the sleeve back onto the first side in a second rotational orientation different from the first rotational orientation.

* * * * *